May 28, 1935. G. A. LYON 2,002,784
COVER FOR SPARE TIRES OF AUTOMOBILES
Filed Oct. 25, 1929 2 Sheets-Sheet 1
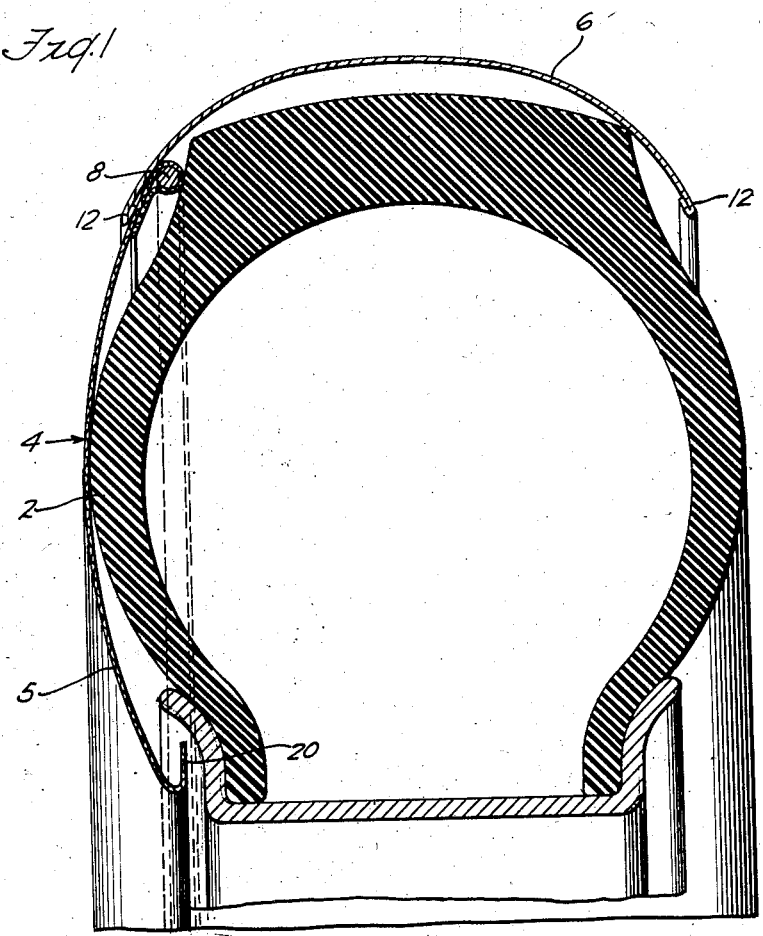
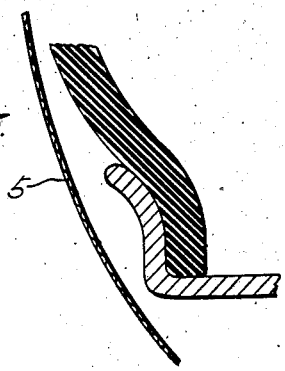
INVENTOR
GEORGE ALBERT LYON
BY
ATTORNEYS

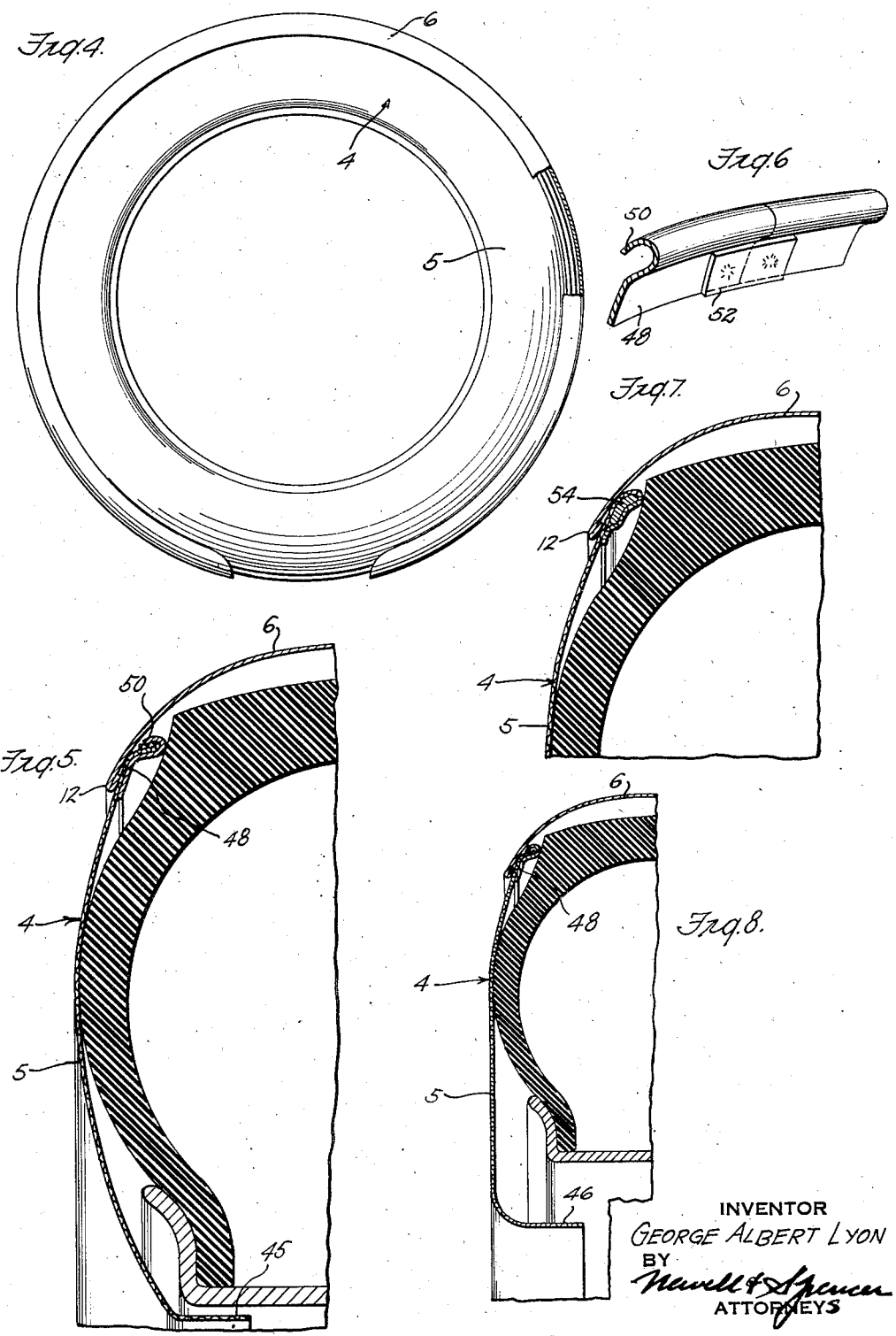

Patented May 28, 1935

2,002,784

UNITED STATES PATENT OFFICE 2,002,784

COVER FOR SPARE TIRES OF AUTOMOBILES

George Albert Lyon, Allenhurst, N. J., assignor to Lyon Incorporated, Asbury Park, N. J., a corporation of Delaware Application October 25, 1929, Serial No. 402,361

2 Claims. (Cl. 150—54)

This invention relates to covers for the spare tires of automobiles.

Certain tire covers which have been devised for spare tires consist of a casing made of sheet metal and arranged to extend about the periphery of the tire and over the outer side surface of the tire. Such covers are highly satisfactory where the spare tire is mounted on a car in a position in which the cover is not liable to be struck by another car. This is the case where the spare tire is mounted in a well on the running board or where the car is protected at the rear by a bumper extending completely across the car at the rear of the tire carrier. These covers, however, when they are mounted upon spare tires located on the car in a position such that the cover is exposed to contact by another car, often become permanently distorted and bent out of shape by contact of another car therewith. This is particularly true where the tire cover is applied to a spare tire mounted on a tire carrier at the rear of a car having bumperettes extending merely across the rear of each rear fender and leaving the spare tire exposed. It is common practice when cars are parked in crowded spaces for one car to push another car forward by the contact of the bumper of the first car with the bumperettes or spare tire at the rear of the forward car. Certain of these bumpers have projecting clips and projecting bends along their central portions which extend between the bumperettes and will make contact with the tire cover before the bumper and bumperettes engage. This often will permanently dent a sheet metal side cover even when it is made of resilient metal.

The primary objects of the present invention are to improve the construction of covers for the spare tires of automobiles and to produce a cover which is much more attractive in appearance than the ordinary fabric cover and in which the portion thereof covering the side surface of a tire will not become permanently bent nor distorted by contact of another car or other object therewith.

With these and other objects in view the invention comprises the novel and improved features, constructions and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the construction therein shown.

In the drawings:

Fig. 1 is a transverse sectional view illustrating a tire cover embodying the invention applied to a tire mounted on a rim.

Fig. 2 is a detail view in side elevation illustrating the construction of certain of the parts of the cover.

Fig. 3 is a detail transverse sectional view of portions of a tire cover, tire and rim, illustrating a slightly modified construction.

Fig. 4 is a view in side elevation partly broken away illustrating the tire cover shown in Fig. 1 applied to a tire.

Fig. 5 is a transverse sectional view illustrating a tire cover of modified form applied to a tire.

Fig. 6 is a detail perspective view illustrating certain parts of the tire cover shown in Fig. 5.

Fig. 7 is a view similar to Fig. 5 illustrating another form of tire cover.

Fig. 8 is a view similar to Fig. 5 showing a side cover member of somewhat different form.

The tire cover as shown in the drawings is applied to a tire 2 supported on a rim.

In the form of the invention illustrated in the drawings the tire cover comprises a cover member 4 constructed to cover one side surface of a tire, and a cover member 6 constructed to extend about and cover the periphery of the tire. The cover member 4 comprises a body 5 formed of relatively thin flexible sheet material and preferably made of textile fabric coated upon one or both sides with a coating material which will give the coated fabric a glazed finished surface. This coating material should be of such a character that it may be molded and preferably consists of material which is slightly softened by the action of heat. In actual practice flexible sheet fabric consisting of cotton drilling coated with a pyroxylin compound, and known in the art as "imitation leather", has been found to give highly satisfactory results. The cover member 4 may be made in the form of a ring as shown in the drawings, constructed to extend substantially from the periphery of the tire over the side surface to the inner margin or bead of the tire. This member, however, if desired, may be constructed to extend from the periphery of the tire to the axis of the tire and rim.

In order to reinforce the flexible fabric of the side cover member 4 at its outer margin, a reinforcing member 8 is attached to the outer margin of said fabric, as shown in Fig. 1. The reinforcing member shown in Fig. 1 consists of a rod of circular cross-section preferably made of steel and having the form of a circular ring about which the margin of the sheet material 5 is wrapped and secured. This ring may be made of a section of rod stock bent into circular form preferably having its ends in registering and abutting relation. It is not essential that the ends of the ring shall be secured together in this relation since, when the ring is attached to the margin of the flexible fabric of the side cover member, the fabric will tend to hold the ends of the ring in this relation. Fig. 2, however, illustrates a simple construction by which the ends of the ring may be secured together if desired. As shown in this figure, a sleeve 7 of substantially the same interior diameter as the exterior diameter of the rod which forms the ring is slipped over the meeting ends of the ring, and the sleeve is then compressed forcibly upon the ends of the ring.

The outer margin of the flexible fabric of the side cover member is preferably secured to the reinforcing member 8 by wrapping the fabric about the ring and attaching the marginal portion of said fabric to the portion of the fabric just inside the ring. Fig. 1 shows the manner in which said fabric is preferably applied to the ring. As shown in this figure, said fabric is applied to the ring so that it extends outwardly substantially straight across the outer face of the ring. The margin of said fabric after passing about the reinforcing ring is turned back against the body of the fabric within the ring and is attached to the fabric within the ring by an adhesive or by stitching the two plies of the fabric together, or in any other suitable or convenient manner. The flexible sheet material of the side cover member is preferably formed without joint or seam, from a single section of sheet material stock.

The side cover member 4 is preferably constructed to conform to a certain degree to the convex curvature of the side wall of the tire, and to this end the flexible sheet material forming the body of said member is given a concavo-convex or other suitable form in cross-section. When flexible material, such as textile fabric coated with a moldable compound which is softened by the action of heat, is employed in the manufacture of the side cover member, said member may be readily molded into this cross-sectional shape.

The fabric member 5, when completed, is in the general form of a side wall of a tire, although said fabric is still flexible and may be bent by the hands in substantially the same manner as before. After each flexing, however, it will tend to return to the form into which it is molded and will assume substantially this form naturally when applied to a tire.

The side cover member 4 is applied to the tire with the concave side thereof adjacent to the side wall of the tire and is preferably arranged to contact with the side wall of the tire at the reinforced outer margin of said member. As shown in Fig. 1, the fabric of the side cover may also contact with the tire at the high point in the bulge in the side wall of the tire. The fabric of the side cover member may be molded into any suitable form to adapt the same to cover the side wall of a tire. As shown in Figs. 1 and 5, the fabric of the side cover is molded in transverse section into a curve of a somewhat larger radius than the radius of the convex portion of the side wall of a tire. As shown in Fig. 8, that part of the fabric of the side cover extending outwardly from the high point in the bulge of the tire has a concave form in cross-section of substantially the same curvature as the corresponding part of the side cover shown in Fig. 5. From the high point in the bulge in the side wall of the tire the fabric extends toward the axis of the side cover in a plane substantially perpendicular to said axis. The inner margin of the fabric 5 is preferably formed with a flange extending at an angle to the body of said fabric. As shown in Fig. 1 the fabric is provided with an inner marginal flange 20 extending outwardly at an acute angle to the body of the fabric. As shown in Fig. 5, the fabric is provided with a flange at its inner margin extending in a direction substantially parallel with the axis of the side cover member. Where the side cover is molded into the form shown in Fig. 8, the fabric is preferably provided at its inner margin with a relatively wide flange 46 extending in a general direction substantially parallel with the axis of the side cover to bridge the gap between the rim and the opposite portion of the fabric. The flange in each case stiffens the inner margin of the side cover and prevents the same from vibrating or being blown out of position by the wind. If desired, the fabric of the side cover may be formed without an inner marginal flange, as shown in Fig. 3.

Instead of a stiffening flange, the inner margin of the fabric of the side cover may be provided with a reinforcing ring. The reinforcing ring may have the same general construction as the reinforcing ring 8 for reinforcing the outer margin of the side cover and may be attached to the fabric in substantially the same manner.

The member 6 of the tire cover which is constructed to extend about the periphery of a tire also has a concavo-convex form in transverse cross-section so as to fit over the periphery of the tire, the tread portion of the tire engaging in the concavity in this member. The cover member 6 is constructed to extend transversely across the tread portion of a tire and to project for some distance beyond the tread portion at its margins. The member 6 is applied to the tire outside of the side cover member 4, and one margin thereof is arranged to overlap and contact with the peripheral portion of the side cover member, and the other margin to engage the tread surface of the tire along one side of the tread. The marginal portions of the cover member 6 are preferably turned back upon the body thereof, as indicated at 12, to form rounded edges.

The member 6 is made in the form of a divided ring and is also preferably formed so that the end portions thereof are separated by a space when said member is applied to a tire, as shown in Fig. 4. This member is constructed of a diameter normally somewhat less than the outside diameter of the tire to which it is to be applied and is made of resilient material having a certain degree of flexibility so that it may be expanded in applying the same to the tire and that the resiliency of the material will cause said member to contract upon the tire when released after its application thereto.

The member 6 may be formed from a strip of sheet metal stock, preferably sheet steel, and may be given substantially the shape shown in the drawings by cold rolling operations. The cold rolling operations will give this member the required degree of resiliency so that it will grip the tire securely upon the contraction of said member.

In applying the tire cover to a tire the side cover member 4 is first applied to one side surface of the tire, and the peripheral cover member 6 is then placed over the tire so that it overlaps the side cover member on one side of the tire and the side wall of the tire on the other side thereof. In applying the member 6, said member is expanded, and, upon its release, the resiliency of the material will cause the same to contract forcibly upon the tire thereby gripping the tread surface of the tire along one side of the tread and the peripheral portion of the side cover member. In gripping the side cover member, the peripheral cover member engages the fabric at the points where the fabric extends over the outer face of the reinforcing ring 8, which material forms a resilient pad so that there will be no objectionable rattles produced by the contact between said cover members. By the contracting action of the peripheral cover member both members of the tire cover will be securely held in position upon the tire.

The construction shown in Fig. 5 is substantially the same as that shown in Figs. 1, 2 and 4 except that a different construction is provided for reinforcing the outer marginal portion of the side cover member 4. In the construction shown in Fig. 5 the fabric of the side cover member is reinforced at its outer margin by means of a reinforcing ring 48, preferably made of strip steel provided with a coating to protect the same from corrosion and having the form in cross-section illustrated in Fig. 5. As shown in this figure the body of the ring 48 is so formed that it lies at an angle to the axis of the tire and rim substantially the same as the inclination of the marginal portion of the cover member 6 which overlaps the side cover, and at its outer margin, this ring is provided with an outwardly turned reversely bent flange indicated at 50. The marginal portion of the fabric 5 is folded back outwardly upon the body of said fabric, and this folded margin is inserted between the body of the reinforcing ring 48 and the reversely bent flange 50. The reversely bent flange is pressed down forcibly upon the fabric so that the fabric is gripped securely between the body of the ring and the edge of said flange.

The side cover member and peripheral cover member are applied to the tire in the same manner as the corresponding members, shown in Figs. 1, 2 and 4. The peripheral cover member overlaps the outer margin of the side cover member in the manner shown in Fig. 5 and contacts with that part of the fabric which extends across the outer surface of the body of the reinforcing ring. Thus there will be no metal to metal contact between the peripheral cover member and the side cover member.

Fig. 6 shows the form of the reinforcing ring before the application of the fabric thereto. As shown in this figure, there is a considerable gap between the edge of the reversely bent margin 50 and the body of the ring, so that the folded margin of the fabric may be readily inserted between the body of the ring and the reversely bent margin. After the insertion of the fabric the reversely bent margin of the ring is bent down into contact with the fabric to hold the same securely in place.

The reinforcing rings 48 are made from strip steel of the desired thickness and are provided with a coating to protect the same from corrosion, this coating being applied of course before the flexible sheet material is attached to the ring. The rings are made from a continuous strip of steel of the desired thickness and are rolled into the desired cross-section and into spiral form in a rolling machine. The continuous strip is cut into sections after the rolling operation to form the individual rings. It is not essential to secure the split ends of each ring together since, after the fabric is attached thereto, the fabric will hold the ring in form. The ends of a ring may be secured together, if desired, by applying thereto a relatively small connecting plate 52, as shown in Fig. 6, which may be spot-welded to the ends of the ring. The fabric is preferably attached to the ring in two power press operations, in one of which the fabric is forced into the recess between the body of the ring and the reversely bent flange 50, and the flange is bent sufficiently to clamp partially the fabric, and in the second of which the flange is forced into position to grip the fabric securely.

The construction shown in Fig. 7 differs from those shown in Figs. 1, 2, 4 and 5 in that a still different form of reinforcing ring is employed. In the construction shown in Fig. 7, the fabric of the side cover is reinforced by means of a reinforcing ring 54 made of relatively light gauge sheet metal and having an arcuate shape in cross-section, as clearly shown in this figure. The outer margin of the fabric of the side cover is secured to the reinforcing ring 54 by wrapping the same about the ring and attaching the margin thereof to the body of the fabric within the ring. The ring 54 is so formed in cross-section that it lies generally at an oblique angle to the axis of the tire and rim. The inner portion of the ring nearer the axis of the tire is inclined to correspond substantially with the inclination of the marginal portion of the peripheral cover member 6 which contacts with the side cover. The transverse curvature of the ring positions the extreme marginal portion of the side cover in spaced relation to the peripheral cover member and increases the distance between the portion of the side cover which is engaged by said member and the side wall of the tire. The reinforcing rings 54 also may be formed from a continuous strip of steel rolled into the desired cross-section and into spiral form which is cut into sections to form the rings.

The coated fabric used in the manufacture of the present tire cover should be such that it may be readily molded into the desired form and that it will hold its form during the life of the cover. To this end, the fabric preferably is fairly heavy and embodies a comparatively thick coating of pyroxylin or similar coating material to enable the fabric to retain efficiently its molded form. Certain of the lighter coated fabrics may be molded into the desired form, but they have not sufficient body to stand up under actual commercial use. With a tire cover made of such fabric the currents created at the rear of an automobile and at the sides thereof will deflect the inner margin of the fabric of the side cover out of proper position and impair the appearance of the cover. For this reason a comparatively heavy bodied material preferably is used in the manufacture of tire covers of this character. A relatively light stock may be used where this stock is embossed with ribs forming a design as is often done in forming certain ornamental coated fabrics, provided that the ribs of the design are formed sufficiently deep to stiffen the whole fabric section of the side cover member. The ribs formed on the stock increase its stiffness and produces results similar to those produced by the use of the heavy bodied stock.

In designing tire covers made as a whole or in part of coated fabric such as that employed in the present cover it has been the practice to use considerable oil in the pyroxylin compound so that the fabric will flex readily and not crack in applying the cover to and removing the same from the tire. In the present tire cover it is not necessary to flex the fabric of the side cover member in applying said member to or removing the same from the tire. In fact, the construction of said member is such that the fabric is held against flexing during these operations. The oil used in the pyroxylin coating renders this coating slightly sticky so that dust will adhere thereto especially in warm weather. Since, in the present construction, the fabric of the side cover is not flexed in applying the tire cover to and removing the same from a tire, a large proportion of the oil may be omitted from the coating compound. The reduction in the proportion of oil used gives the coating material a higher polish and causes it to retain its luster for a longer period. This also reduces the flexibility of the fabric so that it will hold its shape in a more satisfactory manner after molding.

It is to be understood that the invention is not limited to the particular construction and arrangement of parts herein described, but that the invention may be applied in other ways and embodied in other forms within the scope of the claims.

I claim:

1. A cover for the spare tires of automobiles comprising, in combination, a section of flexible sheet material for covering one side of a tire, and a reinforcing ring of strip material having its outer face inclined to the axis of the ring to which ring the margin of said section is secured to reinforce the same.

2. A cover for the spare tires of automobiles having, in combination, a side cover member comprising a section of flexible sheet material arranged to extend over one side surface of a tire, a reinforcing ring of strip material to which the outer margin of said sheet material is secured to reinforce the same, a peripheral cover member of relatively stiff sheet material, having a concavo-convex form in transverse cross-section and arranged to extend about the peripheral portion of a tire and to overlap the side cover member at the outer margin of said member, said reinforcing ring having an outer surface inclined to the axis of the ring to correspond substantially with the inclination of the portion of the peripheral member which contacts with the side cover member.

GEORGE ALBERT LYON.